Patented Apr. 9, 1935

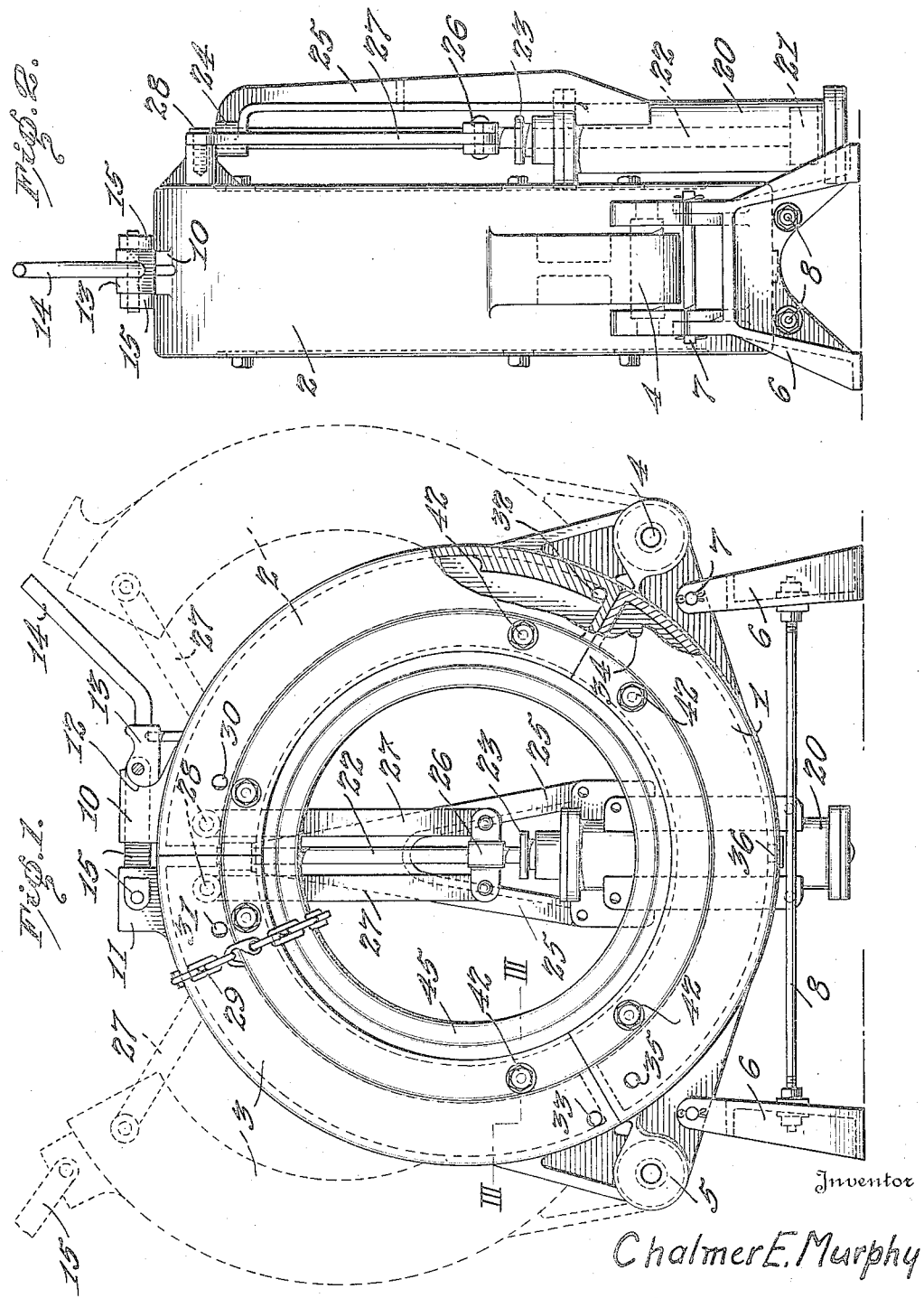

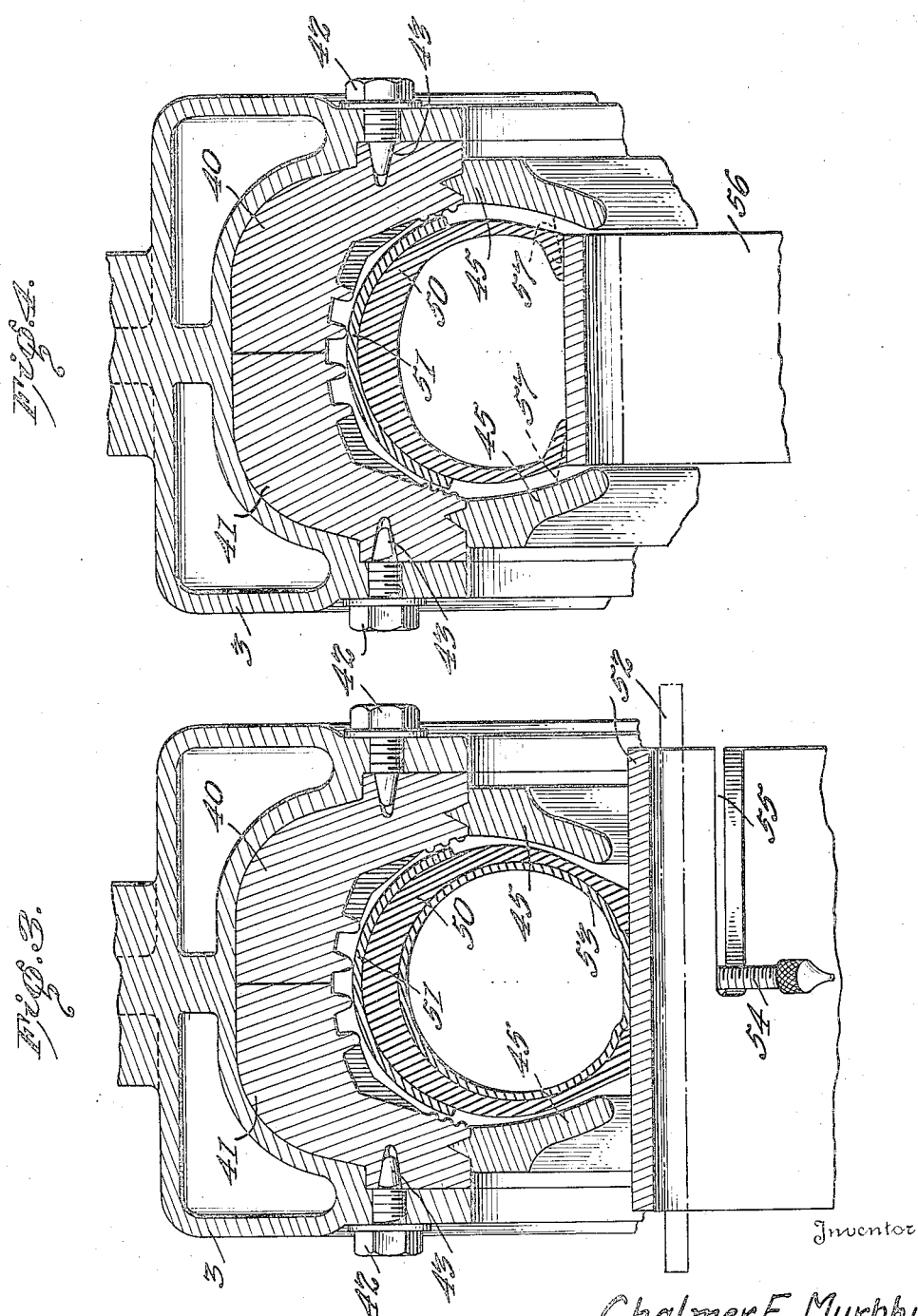

1,996,971

UNITED STATES PATENT OFFICE 1,996,971

APPARATUS FOR VULCANIZING TIRES

Chalmer E. Murphy, Cuyahoga Falls, Ohio, assignor to Mile-O-Tiser, Inc., Akron, Ohio, a corporation of Ohio Application August 16, 1933, Serial No. 685,489

6 Claims. (Cl. 18—18)

This invention relates to apparatus for vulcanizing rubber articles and particularly to molds for retreading automobile tires, the present application covering an improvement upon the vulcanizing apparatus disclosed in my prior application, Ser. No. 576,375 filed November 20, 1931.

In general terms, the object of my invention is to provide improved apparatus of this character in which the tire carcass to be retreaded may be readily placed and from which it may be expeditiously removed after the retreading operation without damaging the tread; and which is adapted to accommodate different sizes of tire casings and to insure uniform heating of the tread portion of the tire during the vulcanizing operation and avoid overheating of the side-walls thereof.

Another object of my invention is to provide a full-circle mold having one or more hinged or movable segments with power means for opening and closing the segments of the mold.

A further object of my invention is to provide improved supporting means for the side-walls of the tire carcass, preferably in the form of rings interlocked with the segments of the mold and supported thereby.

A still further object of my invention is to provide improved means for withdrawing the retreaded tire from the mold.

A still further object of my invention is to provide a mold of the character described having a detachable liner with improved means for wedging the liner into tight contact with the heating element of the mold.

Other objects and advantages of my invention will appear from the following detailed description of the preferred embodiment thereof shown in the accompanying drawings wherein Figure 1 is an elevational view of the mold as constructed for retreading automobile tires;

Fig. 2 is a side view of the mold shown in Fig. 1;

Fig. 3 is a sectional view taken on the line III—III of Fig. 1, showing the tire carcass and supporting rim therefor in section; and Fig. 4 is a similar view showing the adaptation of the apparatus to a smaller tire.

While the invention is not limited to apparatus for retreading automobile tires, certain features thereof are particularly useful in connection with such apparatus or apparatus for vulcanizing articles of similar shape. Consequently, in order to explain the features of the invention, I have shown in the drawings an embodiment adapted to be used for retreading tires.

Referring particularly to Figs. 1 and 2, the retreading apparatus shown comprises a segmental mold consisting of a lower fixed segment 1 and movable segments 2 and 3 hinged to the segment 1 at the points 4 and 5, respectively, in order that the mold may be opened or spread to permit the tire to be mounted therein or removed therefrom in a semi-rigid or inflated condition. As pointed out in my prior application, above referred to, in a full-circle mold of the character described, it is essential that a segmental or expansible mold be employed for retreading tires since the tire may be partially inflated or in a semi-rigid condition when it is placed in the mold so that wrinkles and air-pockets are avoided and a balanced uniform tread is secured as required by high driving speeds. Also by constructing the mold in segments which are outwardly movable in opening the mold after the retreading operation, as indicated in dotted lines in Fig. 1, the possibility of damaging the tread in removing the tire from the mold is greatly reduced.

The segments 1, 2 and 3 of the mold engage the entire tread surface of the tire and when the segments are closed, a true circular mold is formed as necessitated by the requirement of a balanced tread. As shown, the hinges 4 and 5 are of substantial size and may include roller bearings or hardened wearing surfaces so that after prolonged use, the segments will still line up perfectly and form a true circular vulcanizing surface. While it is preferable to employ three segments as shown, each of the movable segments extending for approximately one third of the circumference of the tread, in some cases only two segments or more than three segments may be employed.

One of the segments may be arranged to form a base or support for the mold in any desired manner. As shown, the fixed segment 1 is provided with legs 6 attached to the segment by pins or bolts 7 and braced by the tie rods 8.

The hinged segments 2 and 3 are provided at their upper ends with contiguous integral lugs 10 and 11, respectively. Suitable means for locking the mold in closed relation is provided on said lugs. As shown, the lug 10 is provided with a concave surface 12 conforming to the shape of a cam-shaped locking member 13 provided with a projecting handle 14. The member 13 is pivoted between the ends of two link members 15 which are pivotally carried by the lug 11 on the segment 3. The described construction provides a simple and effective toggle latch by which the segments of the mold may be quickly clamped and locked in closed relation against the internal pressure in the mold during the vulcanizing operation, and released after the operation is completed by raising the handle 14.

In accordance with another feature of the invention, power means is provided for opening and closing the segments of the mold. In the embodiment shown, this power means comprises a hydraulic or fluid-pressure cylinder 20 having a piston 21 therein, the movement of the piston being controlled in the usual manner by admitting and exhausting fluid under pressure to opposite sides of the piston by conventional control valves (not shown).

In the preferred arrangement shown, the power cylinder 20 is mounted vertically midway between the ends of the lower segment 1 and is bolted or otherwise secured thereto in any convenient manner. The reciprocable piston 21 in said cylinder is secured to a piston rod 22 extending through a packing gland 23 at the upper end of the cylinder 20 and a guide 24 adjacent the upper ends of the mold segments 2 and 3. The guide 24 is supported by vertical brackets 25 integral with or mounted upon the cylinder 20. Thus the piston rod 22 coincides with the radius of the mold passing through the contiguous ends of the movable segments 2 and 3.

The operating means for spreading the segments of the mold includes connecting members secured in any desired manner to the piston rod 22, for example to a bracket member 26 mounted thereon intermediate the ends of the rod. The connecting members, as shown, comprise two link members 27 pivoted at their lower ends to the bracket member 26 and at their upper ends to the upper ends of the segments 2 and 3 as indicated at 28, so that the raising and lowering of the piston 21 and piston rod 22 opens and closes the segments of the mold. By reason of the high internal pressures employed during the vulcanizing operation, manual locking means as described above is also provided for securing the segments of the mold in closed relation after the mold has been closed upon the tire to be retreaded.

In order to remove the tire from the segment 1 of the mold after the retreading operation, means may be provided for clamping the tire to one of the movable segments so that the tire is lifted from the fixed segment as the movable segments are opened or spread. As shown, such means may comprise a chain 29 which is looped around the tire and the upper end of one of the movable segments of the mold.

Any suitable means may be provided for heating the segments of the mold during the vulcanizing operation. If steam or other fluid heating medium is employed, the segments are hollow and are provided with inlet and outlet openings for circulation of the heating medium. The temperature may be closely regulated as required by controlling the pressure of the steam in the usual manner. In the mold shown, inlet ports 30 and 31 are provided adjacent the upper ends of the segments 2 and 3 respectively. In accordance with a further feature of the invention, the segments 2 and 3 are provided with outlet openings 32 and 33 at the extreme lower portions of said segments whereby the trapping of condensate in the mold is avoided as it is found that only in this way can uniform heating of the mold be insured. The segment 1 of the mold is similarly provided with inlet ports 34 and 35 at opposite ends thereof and an outlet 36 at the bottom of the mold. If desired, the ports 32—34 and 33—35 may be connected by the usual flexible connections so that the heating medium circulates through the segments 2 and 3 into the fixed segment 1 and out through the outlet 36. The exhaust steam and condensed water may be returned to the boiler.

As shown in Fig. 3, the hollow segments of the mold are provided with a removable liner, preferably consisting of two complementary parts 40 and 41 forming a tight fit with the inner surfaces of the heating portion of the mold to insure good conduction of heat. The inner surface of the liner is provided with recesses and projections to enable a tread of the desired character and appearance to be formed upon the tire. The liner is held in position by clamping studs or pins 42 having tapering or wedge-shaped points 43 adapted to engage suitable recesses or parts of the liner and thereby force the liner into snug contact with the cooperating heating portion of the mold.

In order to support the side-walls of the tire during the retreading operation, supporting members 45, preferably ring-shaped, are provided. The supporting members 45 are not divided in segments as in the case of the mold but are circumferentially continuous and, when the segments of the mold are closed, are interlocked with the mold or the liner thereof so as to be firmly braced against the pressure exerted by the tire. As shown in Fig. 3, the supporting member 45 and the liner may be provided with cooperating grooves and projections for this purpose. When the mold is opened, the supporting members 45 may be readily lifted out of the mold to facilitate the removal of the tire from the mold. It will be noted that since the mold only covers the tread portion and the shoulders of the tire and the supporting rings 45 are exposed to the ambient air and are relatively thin, overheating of the sidewalls of the tire is avoided. Such overheating of the sidewalls of the tire would cause deterioration of the fabric as well understood by those skilled in the art.

Referring to Fig. 3, in retreading a tire, after the usual buffing operation, the tire 50 with the cement and tread stock 51 thereon is inserted in the mold. The tire may be mounted upon a supporting rim 52 of a diameter depending upon the size of the tire. In order that the tire may be partially inflated before closing the mold, an inner tube 53 is used, the valve stem of the inner tube being indicated at 54. The rim 52 is provided with a slot 55 to receive the valve stem 54. By partially inflating the tire before the mold is closed, wrinkles in the tread surface and air pockets between the tire and mold are avoided. The provision of power means for closing the mold permits ready closure of the mold against a semi-rigid tire carcass. The tire may be further inflated, if desired, after closure of the mold until the necessary vulcanizing pressure is obtained. Then steam is admitted to the mold to cure the tread in the usual manner.

As shown in Fig. 4, if the diameter of the rim 56 upon which the tire is mounted is greater than the internal diameter of the members 45, the length of said rim is slightly less than the spacing between said members. When the mold is closed and the tire 50 is fully inflated, the beads of the tire are supported partly by the rim 56 and partly by the members 45, as indicated in dotted lines at 57. The supporting rings 45 extend substantially into contact with the edges of the rim 52 (Figs. 3 and 4) and thus obviate the necessity of employing a supporting rim similar to an ordinary wheel rim provided with means to prevent the beads from spreading under the internal pressure.

Various modifications of the construction shown and described will occur to those skilled in the art; and such modifications are considered within the scope of the invention if within the scope of the appended claims.

I claim:

1. A vulcanizer of the character described comprising an annular element formed of a lower fixed segment and a pair of movable segments pivotally connected at one end to the adjacent ends of said fixed segment, said segments being of substantially equal circumferential lengths and provided with independent heating chambers the inner peripheral surface of said segments being recessed, sectional cooperating matrices of complementary lengths removably disposed in the recessed portions of said segments and movable with the movable segments, said matrices having tread forming portions on the inner peripheral surface thereof, and removable and replaceable continuous circular side wall engaging members disposed upon opposite sides and forming annular inwardly extending continuations of said matrices, there being interengaging formations between the adjacent ends of said matrices and said members to thereby secure said members against relative movement when said segments are in closed position.

2. A vulcanizer of the character described comprising an annular element formed of a lower fixed segment and a pair of movable segments pivotally connected at one end to the adjacent ends of said segment, said segments being of substantially equal circumferential lengths and provided with independent heating chambers, the inner peripheral surface of said segments being recessed, sectional cooperating matrices of complementary lengths removably disposed in the recessed portions of said segments and movable with the movable segments, said matrices having tread forming portions on the inner peripheral surface thereof, means detachably mounted on the side walls of said segments and operatively connected to said sectional matrices for retaining the latter in proper position in said recesses, and removable and replaceable continuous circular side wall engaging members disposed upon opposite sides and forming annular inwardly extending continuations of said matrices, there being interengaging formations between the adjacent ends of said matrices and said members to thereby secure said members against relative movement when said segments are in closed position.

3. A vulcanizer of the character described comprising an annular element formed of a lower fixed segment and a pair of movable segments pivotally connected at one end to the adjacent ends of said fixed segment, said segments being of substantially equal circumferential lengths and provided with independent heating chambers, the inner peripheral surface of said segments being recessed, sectional cooperating matrices of complementary lengths removably disposed in the recessed portions of said segments and movable with the movable segments, said matrices having tread forming portions on the inner peripheral surface thereof, bolts detachably mounted on the side walls of said segments and having reduced inner ends cooperating with aligned openings provided in the adjacent sides of said sectional matrices for retaining the latter in proper position in said recesses, and removable and replaceable continuous circular side wall engaging members disposed upon opposite sides and forming annular inwardly extending continuations of said matrices, there being interengaging formations between the adjacent ends of said matrices and said members to thereby secure said members against relative movement when said segments are in closed position.

4. A vulcanizer of the character described comprising an annular element formed of a lower fixed segment and a pair of movable segments pivotally connected at one end to the adjacent ends of said fixed segment, said segments being of substantially equal circumferential lengths and provided with independent heating chambers, the inner peripheral surface of said segments being recessed, sectional cooperating matrices of complementary lengths removably disposed in the recessed portions of said segments and movable with the movable segments, said matrices having tread forming portions on the inner peripheral surface thereof, and removable and replaceable continuous circular side wall members disposed upon opposite sides and forming annular inwardly extending continuations of said matrices, there being interengaging formations between the adjacent ends of said matrices and said members to thereby secure said members against relative movement when said segments are in closed position, said members being of less thickness than the adjacent portions of said matrices.

5. A vulcanizer of the character described comprising an annular element formed of a lower fixed segment and a pair of movable segments pivotally connected at one end to the adjacent ends of said fixed segment, said segments being of substantially equal circumferential lengths and provided with independent heating chambers, the inner peripheral surface of said segments being recessed, sectional cooperating matrices of complementary lengths removably disposed in the recessed portions of said segments and movable with the movable segments, said matrices having tread forming portions on the inner peripheral surface thereof, and removable and replaceable continuous circular side wall members disposed upon opposite sides and forming annular inwardly extending continuations of said matrices, there being interengaging formations between the adjacent ends of said matrices and said members to thereby secure said members against relative movement when said segments are in closed position, said members being of less thickness than the adjacent portions of said matrices and having tapered outer annular surfaces extending inwardly.

6. A vulcanizer of the character described comprising an annular element formed of a lower fixed segment and a pair of movable segments pivotally connected at one end to the adjacent ends of said fixed segment, said segments being of substantially equal circumferential lengths and provided with independent heating chambers, the inner peripheral surface of said segments being recessed, sectional cooperating matrices of complementary lengths removably disposed in the recessed portions of said segments and movable with the movable segments, said matrices having tread forming portions on the inner peripheral surface thereof, means detachably mounted on the side walls of said segments and operatively connected to said sectional matrices for retaining the latter in proper position in said recesses, and removable and replaceable continuous circular side wall engaging members disposed upon opposite sides and forming annular inwardly extending continuations of said matrices, there being interengaging formations between the adjacent ends of said matrices and said members to thereby secure said members against relative movement when said segments are in closed position, said members being of less thickness than the adjacent portions of said matrices and having tapered outer annular surfaces extending inwardly.

CHALMER E. MURPHY.